United States Patent
Chen et al.

(10) Patent No.: US 7,488,136 B2
(45) Date of Patent: Feb. 10, 2009

(54) ELECTRIC DEVICE AND PIVOT MECHANISM THEREOF

(75) Inventors: Chien-Hung Chen, Wugu Township, Taipei County (TW); Chia-Hung Lin, Taipei (TW); Wen-Ken Wang, Sanchong (TW); Hsin-Hung Lin, Taoyuan (TW)

(73) Assignee: Qisda Corporation, Taoyuan County (TW)

( * ) Notice: Subject to any disclaimer, the term of this patent is extended or adjusted under 35 U.S.C. 154(b) by 123 days.

(21) Appl. No.: 11/420,816

(22) Filed: May 30, 2006

(65) Prior Publication Data

US 2007/0258753 A1 Nov. 8, 2007

(30) Foreign Application Priority Data

May 8, 2006 (TW) ................................ 95116265 A (51) Int. Cl.
*F16C 11/04* (2006.01)

(52) U.S. Cl. ........................... 403/157; 403/85; 403/95; 403/96; 403/117; 403/146; 248/291.1; 248/923; 361/681

(58) Field of Classification Search .................... 403/78, 403/79, 85, 87, 92, 93, 95, 96, 97, 113, 117, 403/146, 150, 151, 152, 157, 161, 162, 351, 403/352; 248/139, 291.1, 919, 922, 923; 361/681
See application file for complete search history.

(56) References Cited

U.S. PATENT DOCUMENTS

| 5,190,391 | A  | * | 3/1993  | Huong ......................... 403/96 |
| 6,125,509 | A  | * | 10/2000 | Hartigan et al. ............... 403/92 |
| 6,618,903 | B2 | * | 9/2003  | Kim ............................. 16/337 |
| 6,666,422 | B1 | * | 12/2003 | Lu et al. ...................... 248/922 |
| 6,813,813 | B2 | * | 11/2004 | Lu et al. ....................... 16/342 |
| 7,013,532 | B2 | * | 3/2006  | Lu et al. ....................... 16/337 |

FOREIGN PATENT DOCUMENTS

| GB | 892347   | 3/1962  |
| GB | 2278587  | 12/1994 |
| TW | I252070  | 3/2006  |

OTHER PUBLICATIONS www.merriam-webster.com, Merriam-Webster's online dictionary, definition of "distal".*

* cited by examiner

*Primary Examiner*—Michael P Ferguson (57) ABSTRACT

An electric device includes a main body, a supporting crutch and a pivot mechanism connecting the body to the crutch. The body is rotated around the crutch through the pivot mechanism. The pivot mechanism includes first and second bearing shims. The first bearing shim has a limiting salient, which has a first sidewall, a second sidewall and an inclined surface. The inclined surface is tilted from the second sidewall to the first sidewall. The second bearing shim has a sliding salient. When the sliding salient is disposed on the first/second sidewall, the main body is positioned at a first/second position. The sliding salient crosses the first sidewall and slides on the inclined surface to the second sidewall by a first force. The sliding salient crosses the second sidewall and slides on the inclined surface to the first sidewall by a second force larger than the first force.

21 Claims, 11 Drawing Sheets

ELECTRIC DEVICE AND PIVOT MECHANISM THEREOF

This application claims the benefit of Taiwan application Serial No. 95116265, filed May 8, 2006, the subject matter of which is incorporated herein by reference.

BACKGROUND OF THE INVENTION

1. Field of the Invention

The invention relates in general to an electric device and a pivot mechanism thereof, and more particularly to an electric device having the adjustment function by three stages of forces, and a pivot mechanism thereof.

2. Description of the Related Art

Various electric devices are rapidly developed and updated, and a part of the electric devices are placed on a table via a supporting crutch such that the user can use the device or devices. Example of a flat panel display, the user often has to adjust the angle of the flat panel display relative to the table so as to provide a comfortable viewing angle.

Figure 1:
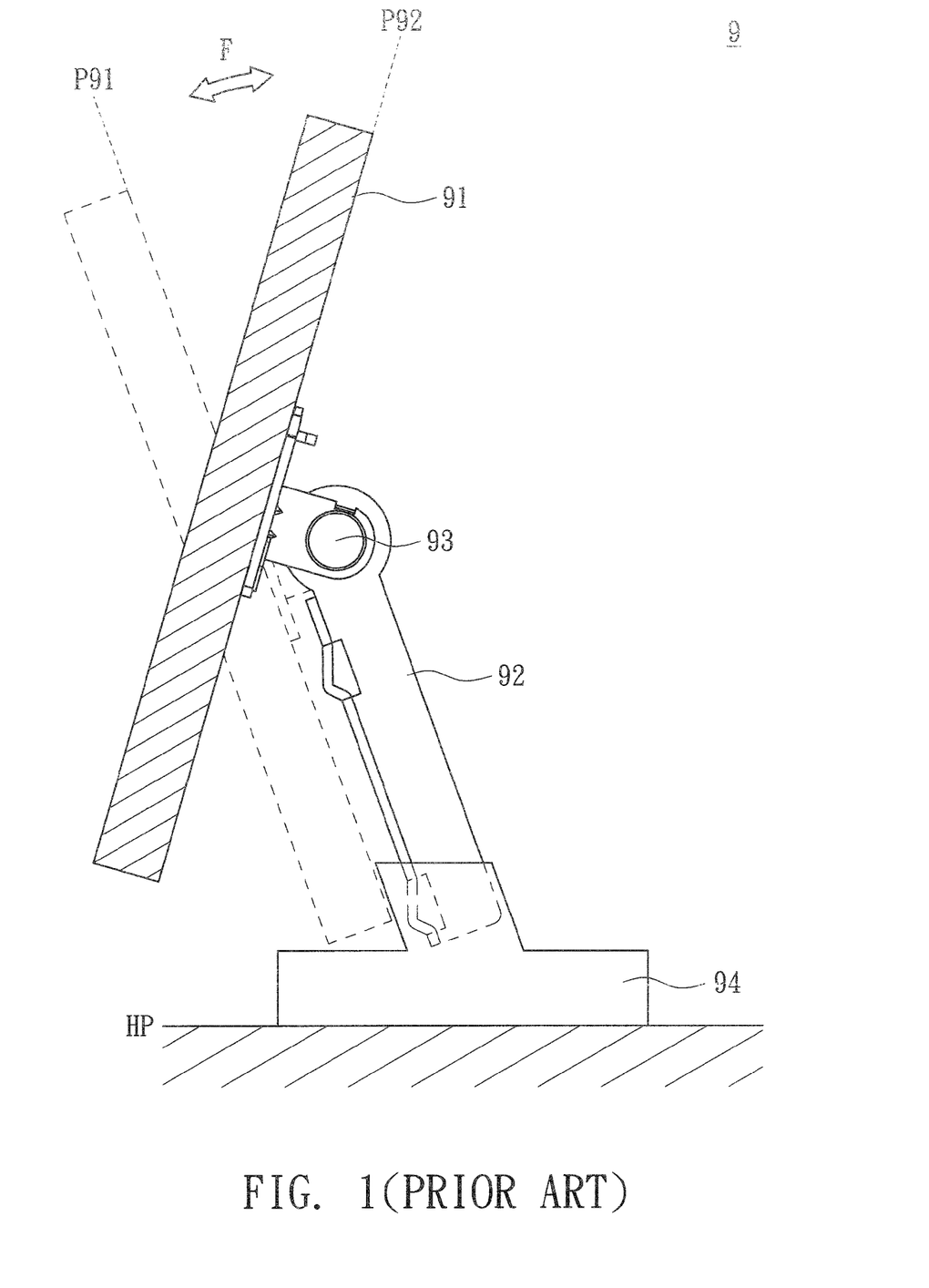
FIG. 1 (Prior Art) is a schematic side view showing a conventional flat panel display under a used state.

FIG. 1 is a schematic side view showing a conventional flat panel display 9 under a used state. Referring to FIG. 1, the flat panel display 9 includes a display main body 91, a supporting crutch 92, a pivot mechanism 93 and a base 94. The pivot mechanism 93 connects the display main body 91 to the supporting crutch 92. The display main body 91 is rotated around the supporting crutch 92 through the pivot mechanism 93 so that the viewing angle is adjusted. The supporting crutch 92 is inserted into the base 94, which is placed on a table HP, to provide a center of gravity for the flat panel display 9.

As shown in FIG. 1, the pivot mechanism 93 is a two-stage pivot. When the flat panel display 9 is in the used state, the display main body 91 may be rotated to a first position P91 or a second position P92 through the pivot mechanism 93. The user may easily apply a force F to push the display main body 91 such that the display main body 91 is rotated from the first position P91 to the second position P92. The user may further push the display main body 91 by the force F to rotate the display main body 91 from the second position P92 to the first position P91. When the display main body 91 is being rotated, the display main body 91 may stay at any place between the first position P91 and the second position P92 so that the most comfortable viewing angle for the user may be adjusted.

Figure 2:
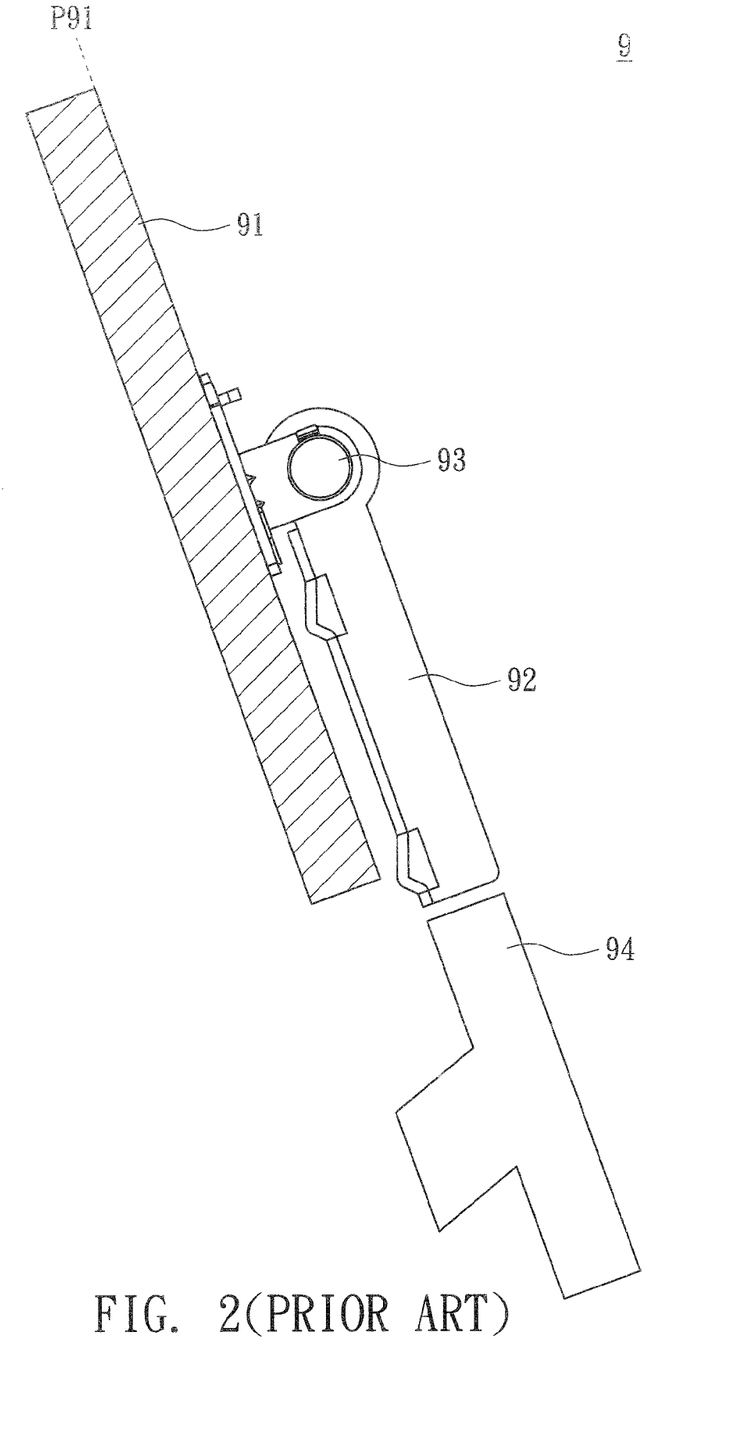
FIG. 2 (Prior Art) is a schematic side view showing the flat panel display of FIG. 1 under a packed state.

FIG. 2 is a schematic side view showing the flat panel display of FIG. 1 under a packed state. The flat panel display 9 of FIG. 1 has the substantially T-shaped structure composed of the display main body 91 and the base 94. So, the packaged T-shaped structure of the flat panel display 9 occupies a lot of space. In order to reduce the package space and the cost of the package material, the base 94 is configured to be separable from the supporting crutch 92, and the display main body 91 is adjusted to the first position P91, such that the display main body 91 is parallel to the supporting crutch 92 and the packaged size of the flat panel display 9 is minimized.

However, when the flat panel display 9 is in the used state, the user can easily adjust the viewing angle of the display main body 91. In the process of adjusting the viewing angle of the display main body 91, the display main body 91 tends to be tilted forward to the first position P91 and knock the user. In addition, when the display main body 91 is positioned at the first position P91, the center of gravity of the flat panel display 9 is tilted forward, which tends to make the flat panel display 9 careen or even crash. Thus, it is an important subject of the invention to solve the above-mentioned problems.

SUMMARY OF THE INVENTION

It is therefore an object of the invention to provide an electric device and a pivot mechanism thereof, wherein a first bearing shim and a second bearing shim are configured such that a main body of the electric device may be adjusted by three stages of forces. Thus, it is possible to prevent the main body from being tilted forward to hurt the user as well as to prevent the center of gravity of the electric device from being tilted forward to cause the danger of careening.

The invention achieves the above-identified object by providing an electric device including a main body, a supporting crutch and a pivot mechanism. The pivot mechanism connects the main body to the supporting crutch. The main body is rotated around the supporting crutch through the pivot mechanism. The pivot mechanism includes a first bearing shim and a second bearing shim. The first bearing shim has a limiting salient, which has a first sidewall, a second sidewall and an inclined surface tilted from the second sidewall to the first sidewall. The second bearing shim has a sliding salient. The main body is positioned at a first position relative to the supporting crutch when the sliding salient is disposed on the first sidewall. The main body is positioned at a second position relative to the supporting crutch when the sliding salient is disposed on the second sidewall. The sliding salient crosses the first sidewall and slides on the inclined surface to the second sidewall by a first force, and the sliding salient crosses the second sidewall and slides on the inclined surface to the first sidewall by a second force larger than the first force.

The invention also achieves the above-identified object by providing a pivot mechanism disposed in an electric device, which comprises a main body and a supporting crutch. The pivot mechanism connects the main body to the supporting crutch. The main body is rotated around the supporting crutch through the pivot mechanism. The pivot mechanism includes a first bearing shim and a second bearing shim. The first bearing shim has a limiting salient, which has a first sidewall, a second sidewall and an inclined surface tilted from the second sidewall to the first sidewall. The second bearing shim has a sliding salient. The main body is positioned at a first position relative to the supporting crutch when the sliding salient is disposed on the first sidewall, and the main body is positioned at a second position relative to the supporting crutch when the sliding salient is disposed on the second sidewall. The sliding salient crosses the first sidewall and slides on the inclined surface to the second sidewall by a first force, and the sliding salient crosses the second sidewall and slides on the inclined surface to the first sidewall by a second force larger than the first force.

Other objects, features, and advantages of the invention will become apparent from the following detailed description of the preferred but non-limiting embodiment. The following description is made with reference to the accompanying drawings.

DETAILED DESCRIPTION OF THE INVENTION

Figure 3:
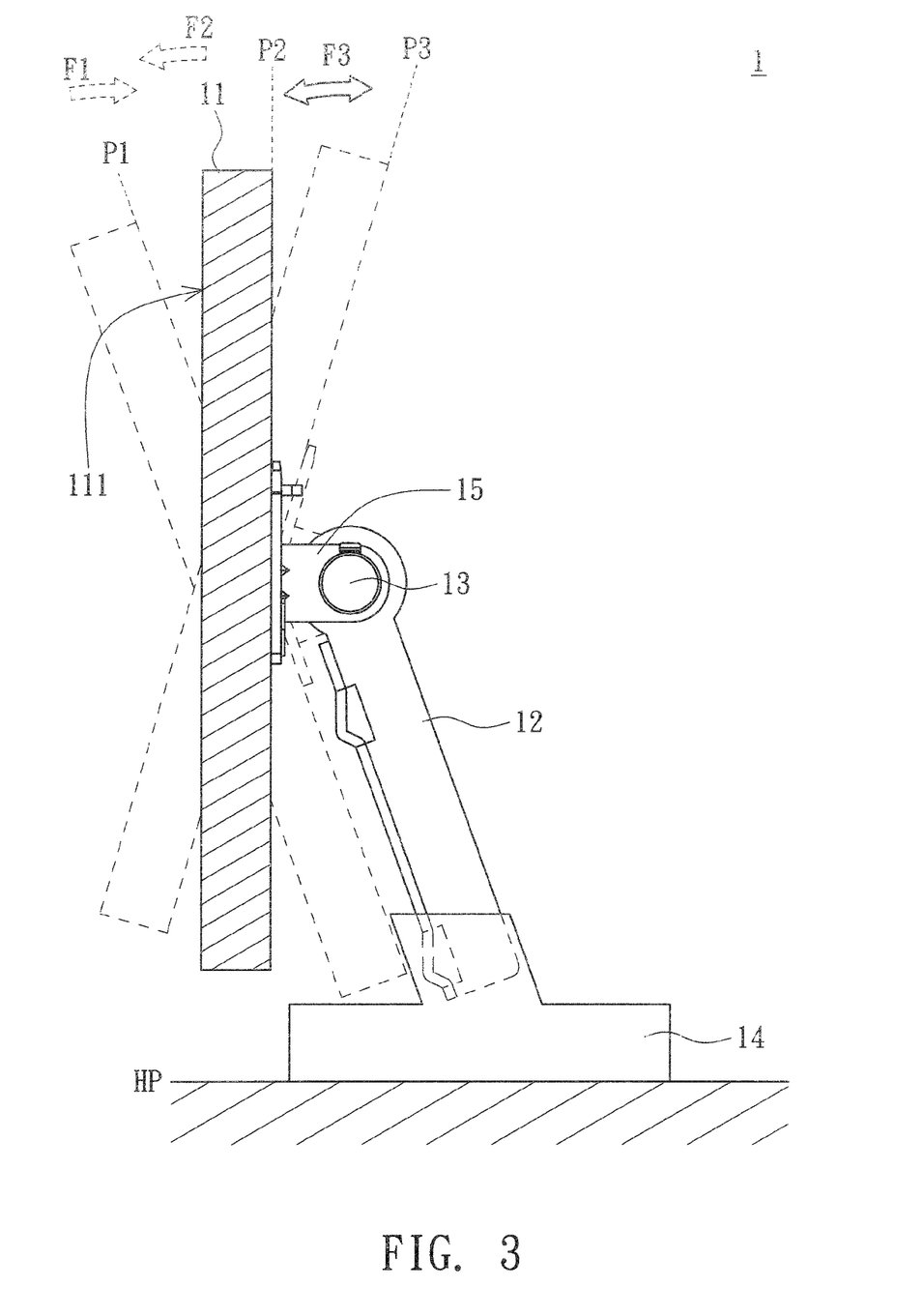
FIG. 3 is a schematic illustration showing an electric device according to a preferred embodiment of the invention.

FIG. 3 is a schematic illustration showing an electric device 1 according to a preferred embodiment of the invention Referring to FIG. 3, the electric device 1 includes a main body 11, a supporting crutch 12, a pivot mechanism 13, a base 14 and a connector 15. In this embodiment, the electric device 1 is a flat panel display, the main body 11 has a display surface 111, and the supporting crutch 12 is inserted into the base 14 placed on a table HP. The pivot mechanism 13 is a three-stage pivot for connecting the main body 11 to the supporting crutch 12. The connector 15 couples the main body 11 to the pivot mechanism 13. The main body 11 is rotated to a first position P1, a second position P2 or a third position P3 relative to the supporting crutch 12 through the pivot mechanism 13. When the main body 11 is located at the first position P1, the main body 11 is substantially parallel to the supporting crutch 12 to facilitate package. When the main body 11 is located between the second position P2 and the third position P3, the main body 11 is positioned at a visible region to facilitate the user in watching the display surface 111.

After the user removes the package, he or she may push the main body 11 by a first force F1 to rotate the main body 11 from the first position P1 to the second position P2. The first force F1 is about 3 Kg/m/s$^2$. Next, the user further pushes the main body 11 by a third force F3 to a location between the second position P2 and the third position P3 so as to adjust the main body 11 to provide the most comfortable viewing angle. The third force F3 is about 2 Kg/1M/s$^2$. If the user pushes the main body 11 in the direction toward the first position P1, he or she has to apply a larger second force F2, or a jig has to be used to push the main body 11 to the first position P1. The second force F2 is about 8 Kg n/s$^2$. Thus, the main body 11 cannot be rotated to the first position P1 easily to knock the user when the viewing angle is being adjusted. The internal elements of the pivot mechanism 13 and the operational principle thereof will be described to explain the three stages of rotation.

Figure 4A:
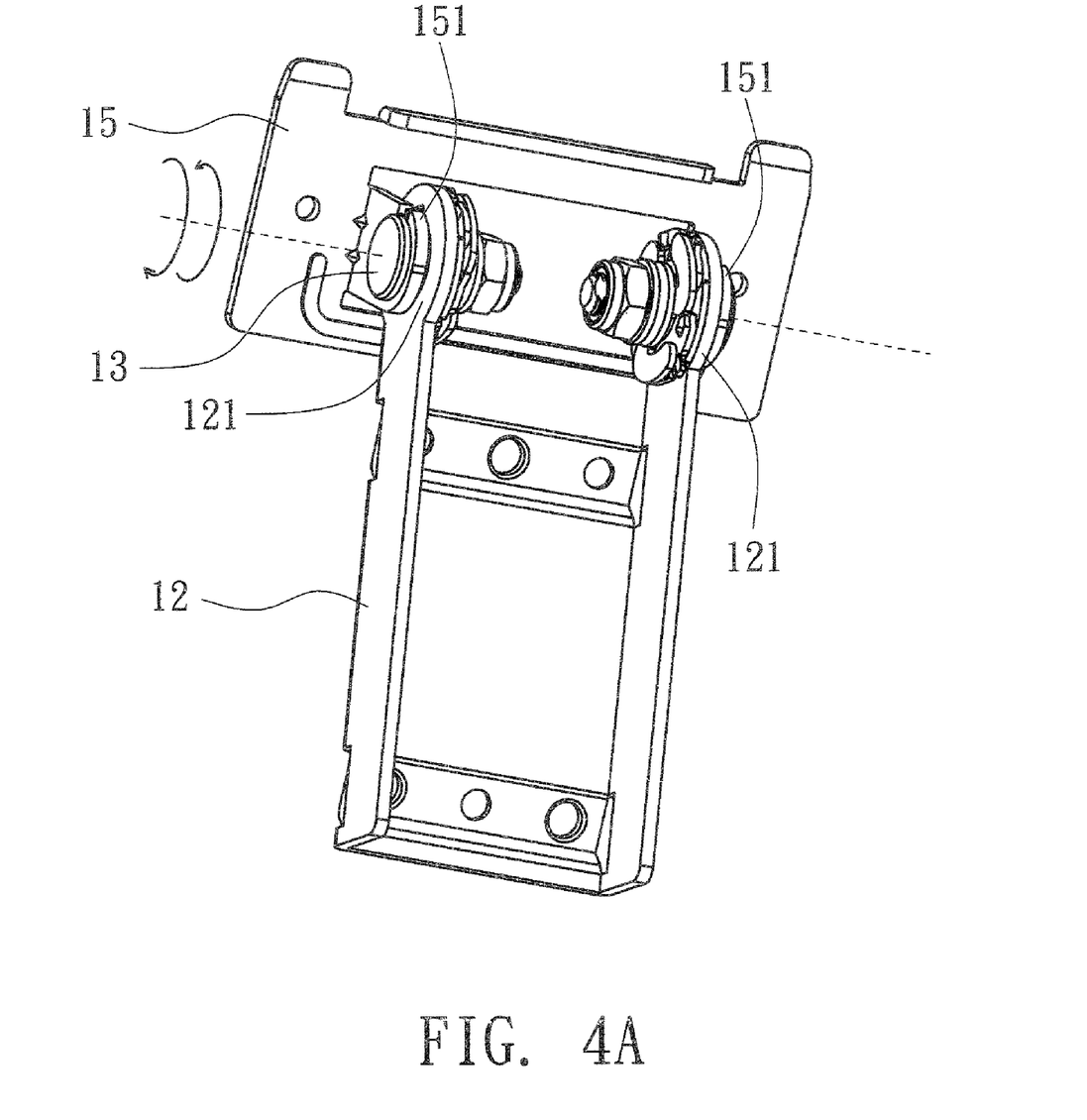
FIG. 4A is a schematic illustration showing a connector, a pivot mechanism and a supporting crutch of FIG. 3.
Figure 4B:
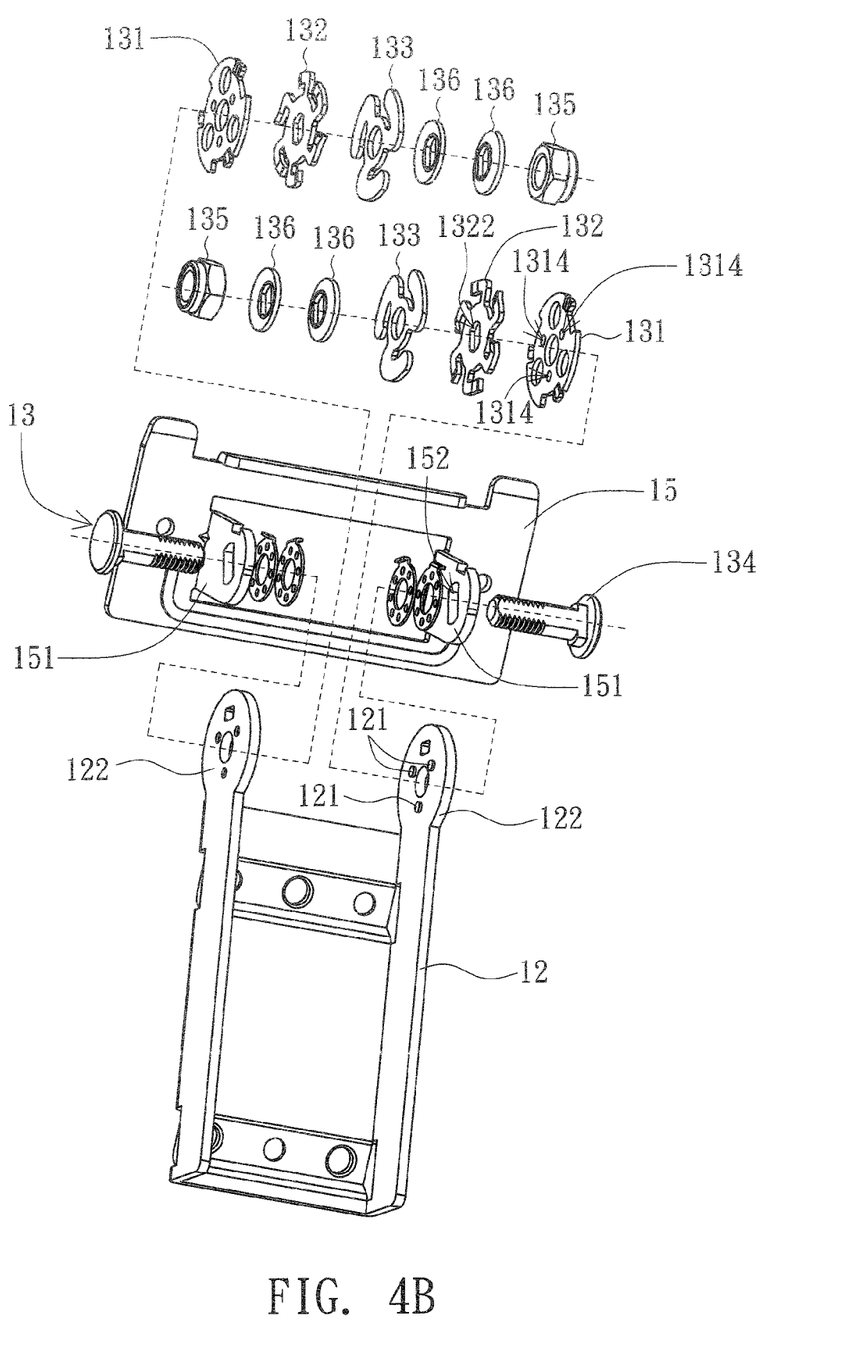
FIG. 4B is a schematically exploded view showing the connector, the pivot mechanism and the supporting crutch of FIG. 4A.
Figure 4C:
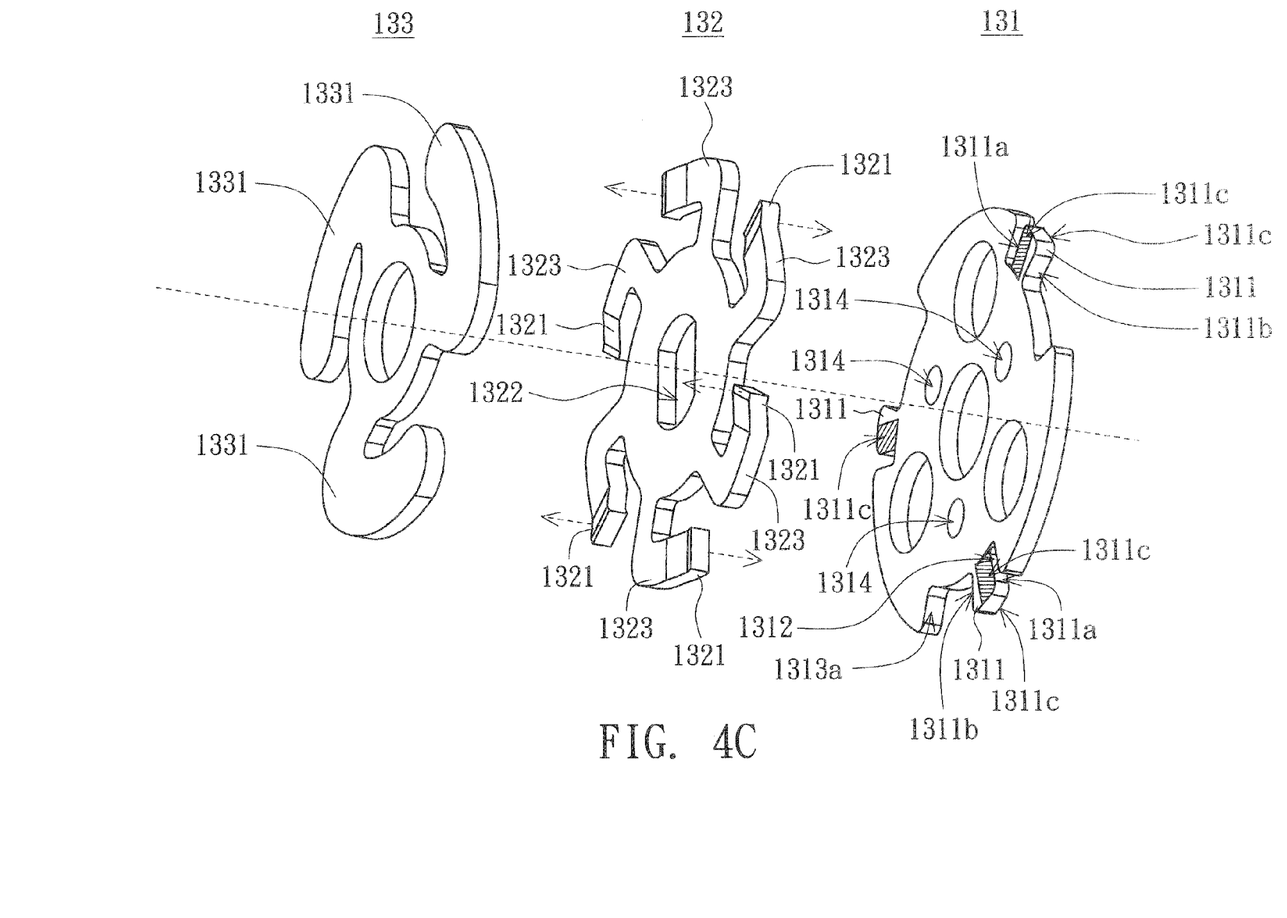
FIG. 4C is an enlarged view showing a first bearing shim, a second bearing shim and a third bearing shim of FIG. 4B.

Please refer to FIGS. 4A to 4C. FIG. 4A is a schematic illustration showing a connector, a pivot mechanism and a supporting crutch of FIG. 3. FIG. 4B is a schematically exploded view showing the connector, the pivot mechanism and the supporting crutch of FIG. 4A. FIG. 4C is an enlarged view showing a first bearing shim, a second bearing shim and a third bearing shim of FIG. 4B. As shown in FIGS. 4A and 4B, the pivot mechanism 13 connects the main body 11 to the supporting crutch 12, and the main body 11 is rotated relative to the supporting crutch 12 through the pivot mechanism 13. The pivot mechanism 13 at least includes a first bearing shim 131 and a second bearing shim 132. As shown in FIG. 4C, the first bearing shim 131 has at least one limiting salient 1311, which has a first sidewall 1311a, a second sidewall 1311b and an inclined surface 1311c. The inclined surface 1311c is tilted from the second sidewall 1311b to the first sidewall 1311a. The second bearing shim 132 has at least one sliding salient 1321.

Figure 5A:
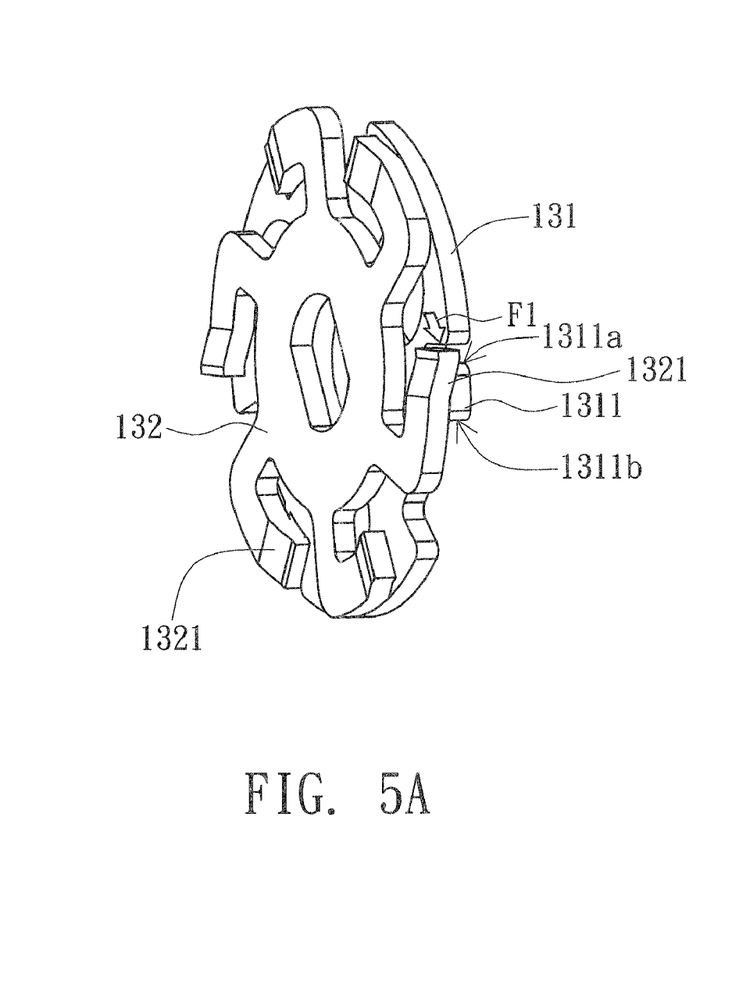
FIGS. 5A and 5B are schematic illustrations showing the first bearing shim and the second bearing shim having a sliding salient disposed on a first sidewall.
Figure 5B:
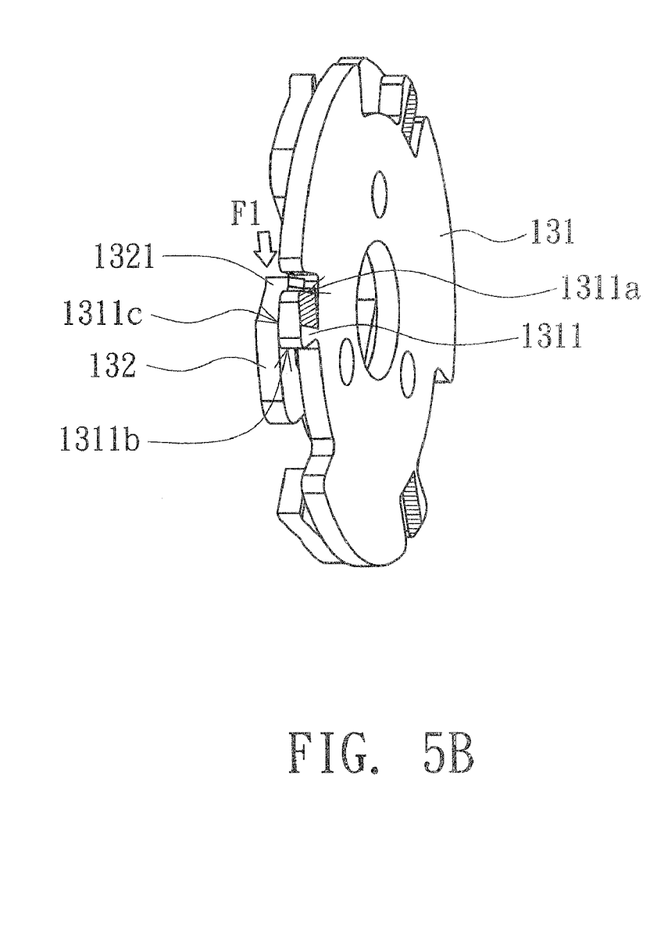
Figure 5C:
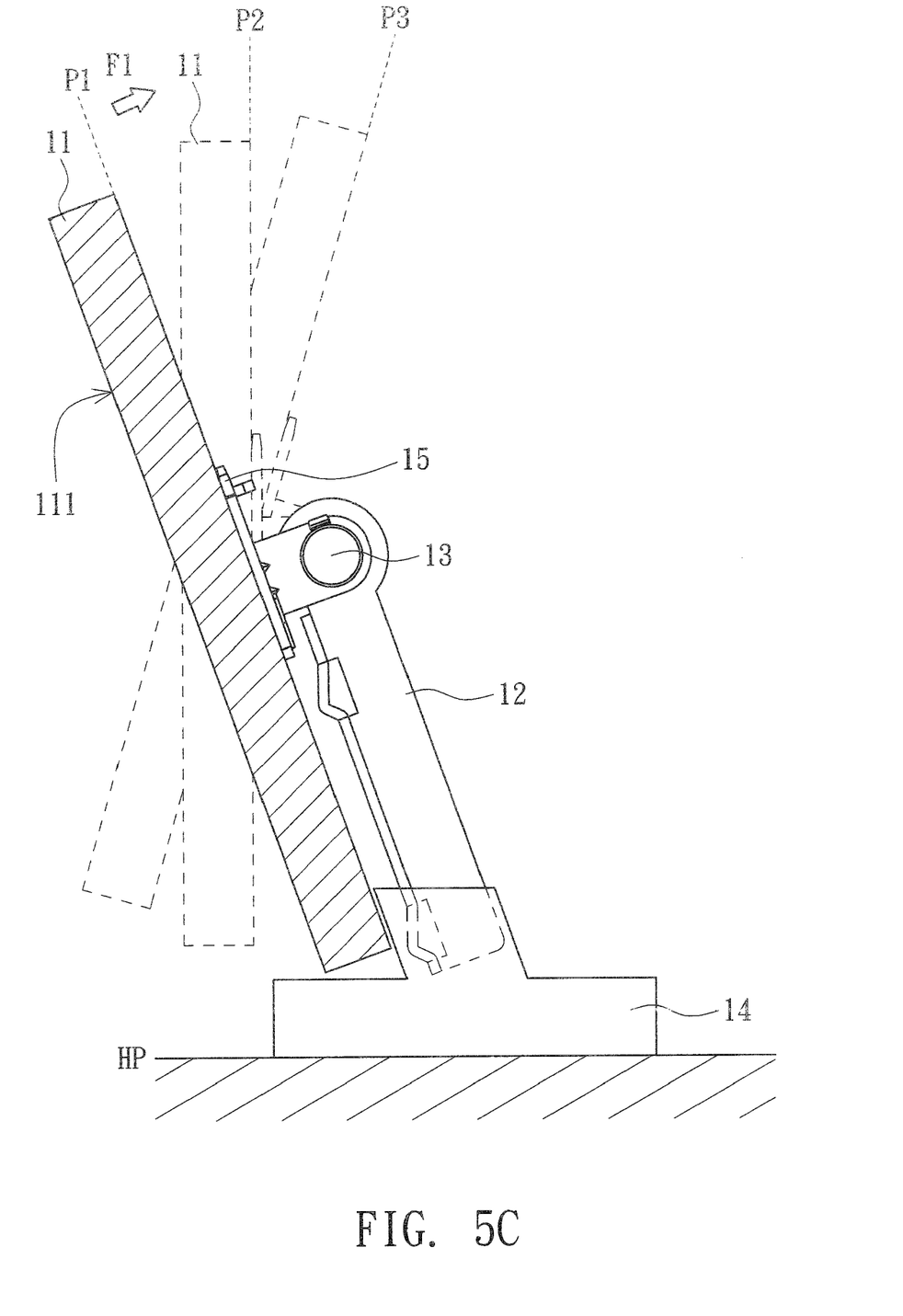
FIG. 5C is a schematic illustration showing the electric device having a main body positioned at a first position.

Please refer to FIGS. 5A to 5C. FIGS. 5A and 5B are schematic illustrations showing the first bearing shim and the second bearing shim having the sliding salient disposed on the first sidewall. FIG. 5C is a schematic illustration showing the electric device having a main body positioned at a first position. When the sliding salient 1321 is disposed on the first sidewall 1311a, as shown in FIGS. 5A and 5B, the main body 11 is positioned at a first position P1 (FIG. 5C) relative to the supporting crutch 12. The first force F1 is applied to push the sliding salient 1321 toward the first sidewall 1311a to deform the second bearing shim 132. Thus, the sliding salient 1321 crosses the first sidewall 1311a and slides on the inclined surface 1311c, as shown in FIGS. 5A and 5B.

Figure 6A:
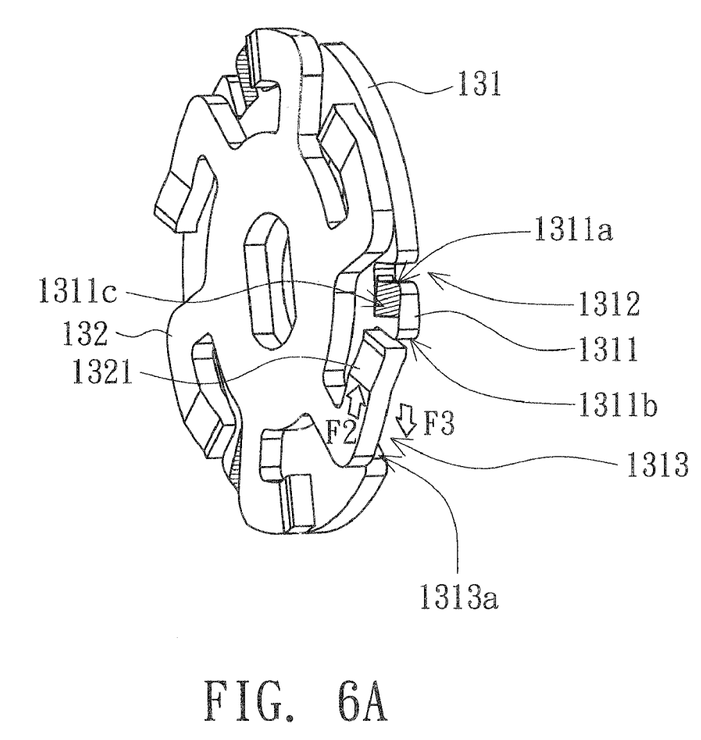
FIGS. 6A and 6B are schematic illustrations showing the first bearing shim and the second bearing shim having the sliding salient disposed on a second sidewall.
Figure 6B:
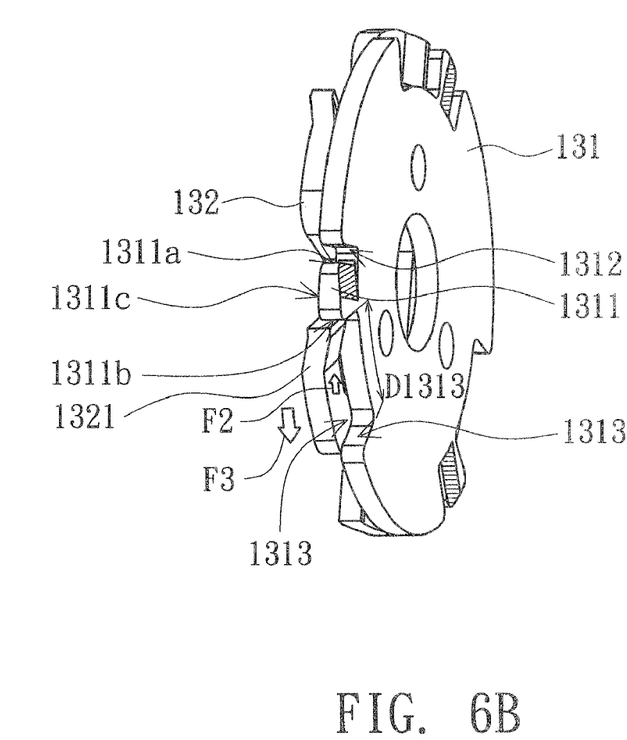
Figure 6C:
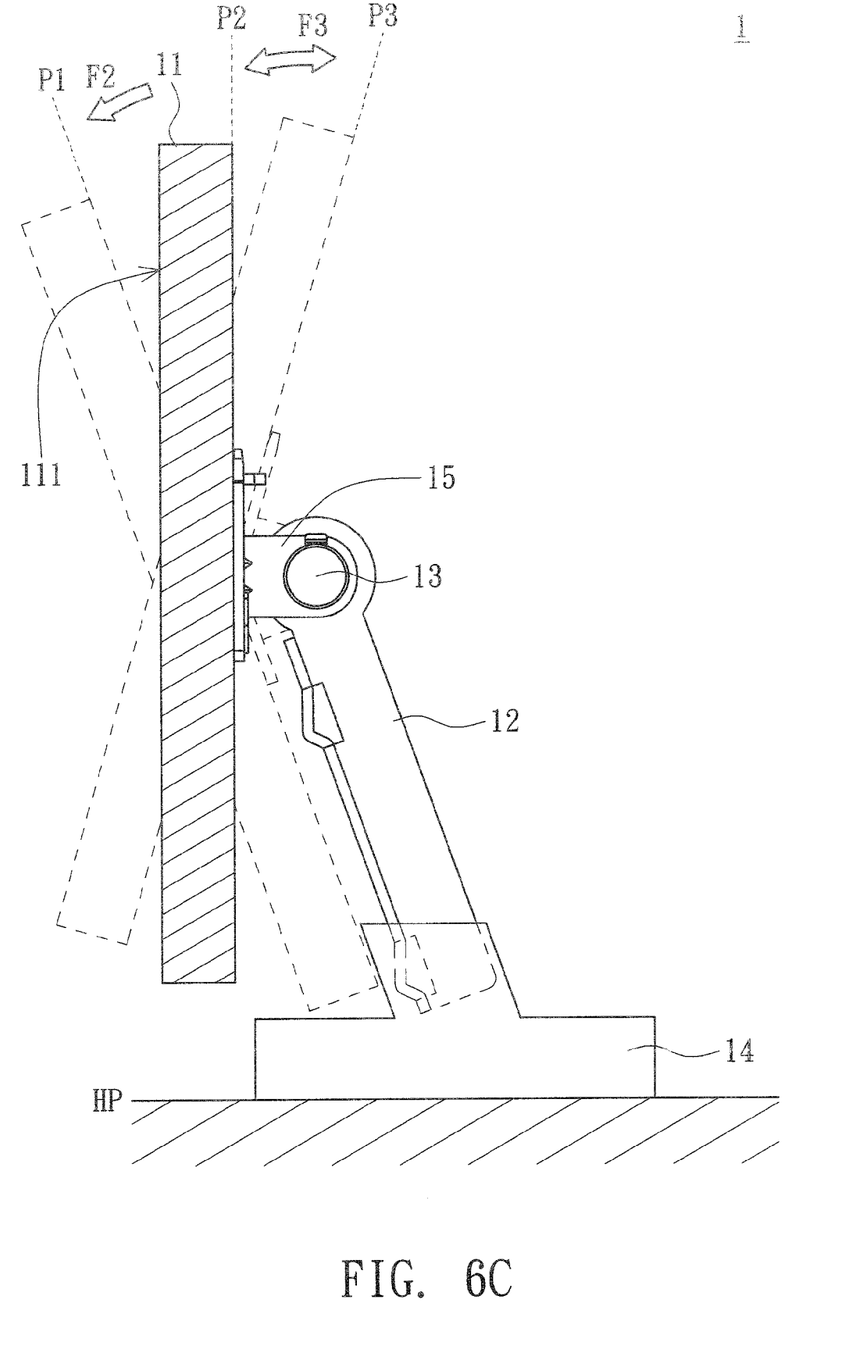
FIG. 6C is a schematic illustration showing the electric device having the main body positioned at a second position.

FIGS. 6A and 6B are schematic illustrations showing the first bearing shim and the second bearing shim having the sliding salient disposed on the second sidewall. FIG. 6C is a schematic illustration showing the electric device having the main body positioned at the second position. The sliding salient 1321 slides on the inclined surface 1311c to the second sidewall 1311b, as shown in FIGS. 6A and 6B. The main body 11 is positioned at a second position P2 (FIG. 6C) relative to the supporting crutch 12. Furthermore, the second force F2 may be applied to push the sliding salient 1321 toward the second sidewall 1311b to deform the second bearing shim 132. The sliding salient 1321 may cross the second sidewall 1311b and slide on the inclined surface 1311c back to the first sidewall 1311a, as shown in FIGS. 5A and 5B. At this time, the main body 11 returns to the first position P1 relative to the supporting crutch 12, as shown in FIG. 5C.

Because the second sidewall 1311b is higher than the first sidewall 1311a, the sliding salient 1321 requires the larger second force F2 to cross the higher second sidewall 1311b. Thus, the user has to apply a larger force to push the main body 11 from the second position P2 to the first position P1.

In addition, the positions of the sliding salient 1321 and the limiting salient 1311 influence the configurations of the first position P1 and the second position P2. The pivot mechanism 13 of the invention may properly adjust the disposing positions of the sliding salient 1321 and the limiting salient 1311 according to different requirements.

Referring again to FIGS. 6A to 6C, the first bearing shim 131 further has an engaging slot 1312 and a sliding slot 1313. The limiting salient 1311 is disposed between the engaging slot 1312 and the sliding slot 1313. The sliding slot 1313 has the second sidewall 1311b and a third sidewall 1313a distant from the second sidewall 1311b by a distance D1313. As shown in FIGS. 6A and 6B, the sliding salient 1321 may slide back and forth between the second sidewall 1311b and the third sidewall 1313a along the sliding slot 1313 by the third force F3. As shown in FIG. 6C, when the sliding salient 1321 is disposed on the third sidewall 1313a, the main body 11 is positioned at the third position P3 relative to the supporting crutch 12.

Because the sliding salient 1321 is never blocked by any element or projection as it slides back and for h along the slot wall of the sliding slot 1313, only the small third force F3 is needed to make the sliding salient 1321 slide smoothly. Thus, the user can push the main body 11 to move between the second position P2 and the third position P3 with a small force.

Furthermore, the distance D1313 between the second sidewall 1311*b* and the third sidewall 1313*a* of the sliding slot 1313 influences the gap between the second position P2 and the third position P3. The pivot mechanism 13 of the invention may properly adjust the distance D1313 according to different requirements so as to obtain the best visible region.

Referring again to FIG. 4B, the first bearing shim 131 has several positioning sink holes 1314, and the supporting crutch 12 has several positioning salients 121 corresponding to the positioning sink holes 1314 such that the first bearing shim 131 and the supporting crutch 12 engage with each other and can be rotated synchronously. The connector 15 has a first shaft hole 152, and the second bearing shim 132 has a second shaft hole 1322. The pivot mechanism 13 further includes two screws 134. The cross-sectional profiles of the screw 134, the first shaft hole 152 and the second shaft hole 1322 are substantially similar to one another. The screw 134 passes through the first shaft hole 152 and the second shaft hole 1322 such that the main body 11, the connector 15 and the second bearing shim 132 engage with one another and can be rotated synchronously. Consequently, when the first bearing shim 131 is rotated relative to the second bearing shim 132, the main body 11 is rotated synchronously relative to the supporting crutch 12.

The pivot mechanism 13 further includes a nut 135 fit with the screw 134 to clamp the connector 15 and the second bearing shim 132.

Referring again to FIGS. 4A and 4B, the pivot mechanism 13 of this embodiment includes two first bearing shims 131 and two second bearing shims 132. The supporting crutch 12 has two supporting crutch side plates 122, which are parallel to and opposite to each other, for respectively coupling with the first bearing shims 131. The connector 15 further has two connector side plates 151, which are parallel to and opposite to each other, for respectively coupling with the second bearing shims 132. Consequently, the pivot mechanism 13 has the two-sided structure to obtain the better stability.

Referring to FIG. 4C, the limiting salient 1311 has two inclined surfaces 1311*c* disposed at two sides of the first bearing shim 131. The second bearing shim 132 at least has two sliding salients 1321 protruding toward two opposite sides of the second bearing shim 132. In this embodiment, the first bearing shim 131 has three limiting salients 1311 evenly disposed around the first bearing shim 131. The second bearing shim 132 has six sliding salients 1321, which alternately protrude toward two opposite sides of the second bearing shim 132 and are evenly disposed around the second bearing shim 132. Thus, two sides of the first bearing shim 131 have symmetrical structures, and two sides of the second bearing shim 132 also have symmetrical structures. During the assembling process, any side of the first bearing shim 131 may rest tightly against any side of the second bearing shim 132 to set one of the side structures of the pivot mechanism 13. It is unnecessary to additionally cast a second set of the first bearing shims and the second bearing shims, and it is very convenient for usage.

Referring again to FIG. 4C, the second bearing shim 132 has an extension arm 1323, and the sliding salient 1321 is disposed at a distal end of the extension arm 1323. Thus, the second bearing shim 132 tends to deform more easily when the first force F1 and the second force F2 push the sliding salient 1321.

In addition, referring to FIG. 4C, the pivot mechanism 13 further includes at least one third bearing shim 133 resting against the second bearing shim 132. The third bearing shim 133 has a cantilever arm 1331 resting against the second bearing shim 132. The cantilever arm 1331 extends outward from a center position of the third bearing shim 133. The length of the cantilever arm 1331 relates to the magnitudes of the first force F1, the second force F2 and the third force F3.

Figure 7A:
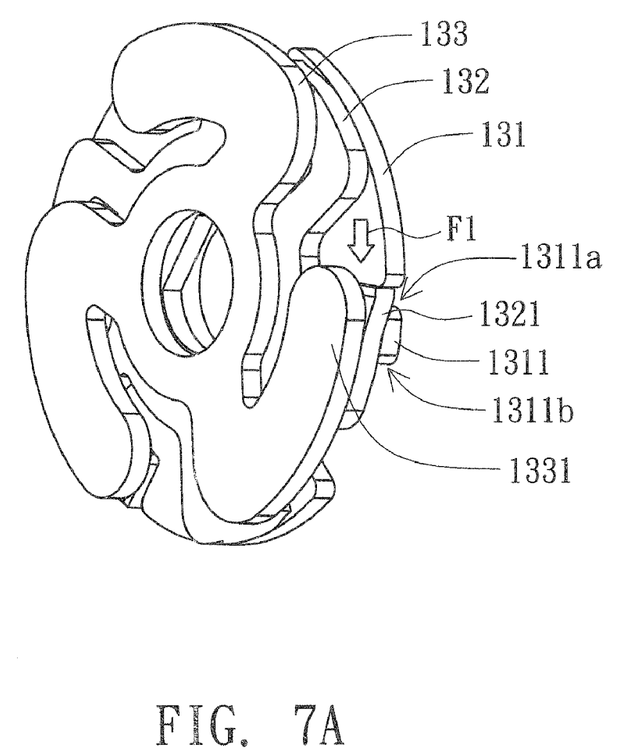
FIG. 7A is a schematic illustration showing the first bearing shim, the second bearing shim having the salient disposed on the first sidewall and the third bearing shim.

FIG. 7A is a schematic illustration showing the first bearing shim, the second bearing shim having the sliding salient disposed on the first sidewall and the third bearing shim. As shown in FIG. 7A, when the user wants to push the sliding salient 1321 by the first force F1 to make the sliding salient 1321 cross the first sidewall 1311*a*, the sliding salient 1321 not only has to cross the first sidewall 1311*a* but also has to resist the force of the cantilever arm 1331 for resting against the sliding salient 1321. However, the longer the cantilever arm 1331 is, the easier the elastic movement of the cantilever arm 1331 is. That is, lengthening the cantilever arm 1331 can reduce the magnitude of the first force F1. On the contrary, shortening the cantilever arm 1331 can increase the magnitude of the first force F1.

Figure 7B:
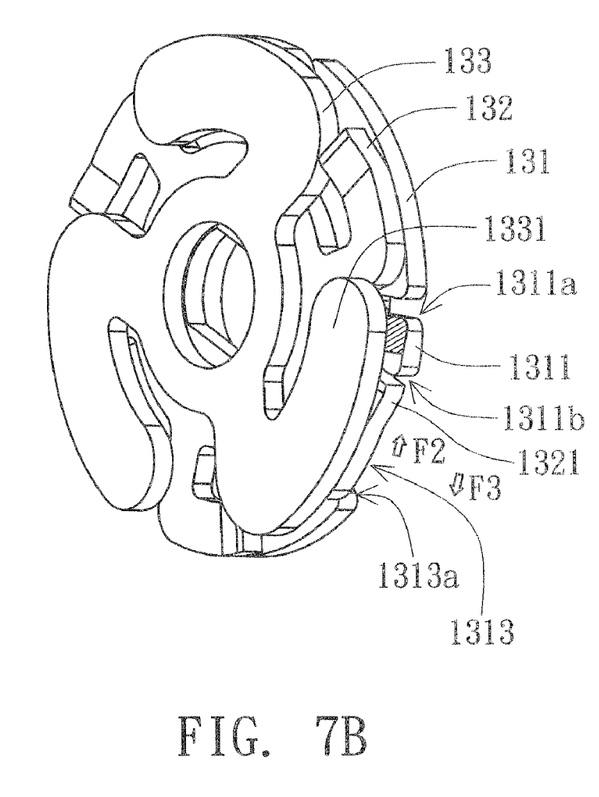
FIG. 7B is a schematic illustration showing the first bearing shim, the second bearing shim having the salient disposed on the second sidewall and the third bearing shim.

FIG. 7B is a schematic illustration showing the first bearing shim, the second bearing shim having the sliding salient disposed on the second sidewall and the third bearing shim. When the user wants to push the sliding salient 1321 by the second force F2 to make the sliding salient 1321 cross the second sidewall 1311*b*, the sliding salient 1321 not only has to cross the second sidewall 1311*b* but also has to resist the force of the cantilever arm 1331 for resting against the sliding salient 1321. However, the longer the cantilever arm 1331 is, the easier the elastic movement of the cantilever arm 1331 is. That is, lengthening the cantilever arm 1331 can reduce the magnitude of the second force F2. On the contrary, shortening the cantilever arm 1331 can increase the magnitude of the second force F2.

As shown in FIG. 7B again, when the user wants to push the sliding salient 1321 to slide back and forth between the second sidewall 1311*b* and the third sidewall 1313*a* along the sliding slot 1313 by the third force F3, lengthening the cantilever arm 1331 can reduce the magnitude of the third force F3. On the contrary, shortening the cantilever arm 1331 can increase the magnitude of the third force F3.

Consequently, the pivot mechanism 13 can adjust the magnitudes of the first force F1, the second force F2 and the third force F3 in a convenient way by adjusting the length of the cantilever arm 1331.

Preferably, referring to FIG. 4B, the pivot mechanism 13 further includes an elastic member 136 having two elastic metal sheets, which are disposed between the connector 15 coupled to the main body 11 and the second bearing shim 132, and tightly press the second bearing shim 132 and the first bearing shim 131.

According to the above-mentioned embodiment, although the second bearing shim 132 of the invention having six sliding salients 1321 are illustrated, the second bearing shim 132 of the invention may have only three sliding salients 1321 or one sliding salient 1321. As long as the first bearing shim 131 has the corresponding structure design of the limiting salient 1311 to achieve the object of the requirement of different forces for different orientations, any modification still falls within the technological range of the invention.

Furthermore, although the electric device 1 of the invention is a flat panel display, the electric device 1 of the invention may be any electric device having two elements that can be rotated relative to each other. Any application of the pivot mechanism of the invention still falls within the technological range of the invention.

In addition, the supporting crutch 12 and the first bearing shim 131 of the invention are rotated synchronously, and the main body 11 and the second bearing shim 132 are rotated synchronously in the example. However, a reverse design, in which the supporting crutch 12 and the second bearing shim 132 may be rotated synchronously, and the main body 11 and the first bearing shim 131 are rotated synchronously, may also achieve the effect of the invention.

The electric device 1 and the pivot mechanism 13 disclosed in the embodiment of the invention utilize the corresponding designs of the first bearing shim 131 and the second bearing shim 132 so that the electric device 1 has the following advantages.

First, the main body 11 of the electric device 1 of the invention may be rotated among the first position P1, the second position P2 and the third position P3 by the first force F1, the second force F2 and the third force F3. In particular, the user has to apply the larger second force F2 so as to push the main body 11 from the visible region (between the second position P2 and the third position P3) to the package position (the first position P1) and the main body 11 is free from being tilted forward to knock the user.

Second, each of the first bearing shim 131 and the second bearing shim 132 of the invention has symmetrical structures at two sides. During the assembling process, the first bearing shim 131 may be disposed at one end of the pivot mechanism 13 with one end of the first bearing shim 131 resting against one end of the second bearing shim 132. Thus, it is unnecessary to additionally cast a second set of first bearing shims and second bearing shims, and the usage is very convenient.

Third, the pivot mechanism 13 of the invention may conveniently adjust the magnitudes of the first force F1, the second force F2 and the third force F3 by adjusting the length of the cantilever arm 1331 of the third bearing shim 133.

Fourth, the second bearing shim 132 of the invention has the structure design of the extension arm 1323, so the sliding salient 1321 can cross the first sidewall 1311a or the second sidewall 1311b more easily and the pivot mechanism 13 may be rotated more smoothly.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electric device, comprising:
a main body;
a supporting crutch; and
a pivot mechanism for connecting the main body to the supporting crutch, wherein the main body is rotated around the supporting crutch through the pivot mechanism, and the pivot mechanism comprises:
a first bearing shim having three limiting salients, each of which has a first sidewall, a second sidewall and two inclined surfaces tilted from the second sidewall to the first sidewall and disposed at corresponding two sides of the first bearing shim; and
a second bearing shim having six sliding salients and six extension arms, wherein each of the extension arms is a long shaped structure, each of the sliding salients is disposed at a distal end of one of the extension arms, the sliding salients alternately protrude toward the corresponding two sides of the second bearing shim, the main body is positioned at a first position relative to the supporting crutch when three of the sliding salients are disposed on the first sidewalls, and the main body is positioned at a second position relative to the supporting crutch when the three of the sliding salients are disposed on the second sidewalls,
wherein three of the sliding salients cross the first sidewalls and slide on the inclined surfaces to the second sidewalls by a first force, and three of the sliding salients cross the second sidewalls and slide on the inclined surfaces to the first sidewalls by a second force larger than the first force.

2. The electric device according to claim 1, wherein the first bearing shim further has an engaging slot and a sliding slot, the limiting salient is disposed between the engaging slot and the sliding slot, the sliding slot has the second sidewall and a third sidewall distant from the second sidewall by a distance, the sliding salient slides back and forth between the second sidewall and the third sidewall along the sliding slot by a third force, and the main body is positioned at a third position relative to the supporting crutch when the sliding salient is disposed on the third sidewall.

3. The electric device according to claim 2, wherein the electric device is a flat panel display, the main body has a display surface, and the supporting crutch is to be placed on a table.

4. The electric device according to claim 3, wherein:
the main body is substantially parallel to the supporting crutch to facilitate packaging when the main body is positioned at the first position; and
the main body is positioned in a visible region to facilitate a user in watching the display surface when the main body is located between the second position and the third position.

5. The electric device according to claim 1, wherein the pivot mechanism further comprises:
an elastic member, which is disposed between the main body and the second bearing shim, for tightly pressing the second bearing shim and the first bearing shim together.

6. The electric device according to claim 1, wherein the first bearing shim has a plurality of positioning sink holes, and the supporting crutch has a plurality of positioning salients corresponding to the positioning sink holes such that the first bearing shim and the supporting crutch engage with each other and are synchronously rotated.

7. The electric device according to claim 1, further comprising a connector for coupling the pivot mechanism to the main body, wherein the connector has a first shaft hole, the second bearing shim has a second shaft hole, and the pivot mechanism further comprises:
a screw, wherein the cross-sectional profiles of the screw, the first shaft hole and the second shaft hole are substantially similar to one another, and the screw passes through the first shaft hole and the second shaft hole to fasten the main body, the connector and the second bearing shim together such that the main body, and the connector and the second bearing shim are rotated synchronously.

8. The electric device according to claim 7, wherein the pivot mechanism comprises two first bearing shims and two second bearing shims, the supporting crutch has two supporting crutch side plates opposite to each other in parallel and to be respectively coupled to the first bearing shims, and the connector further has two connector side plates opposite to each other in parallel and to be respectively coupled to the second bearing shims.

9. The electric device according to claim 1, wherein the extension arm is an L-shaped structure.

10. A pivot mechanism disposed in an electric device, which comprises a main body and a supporting crutch, the pivot mechanism connecting the main body to the supporting crutch, the main body being rotated around the supporting crutch through the pivot mechanism, the pivot mechanism comprising:
a first bearing shim having a limiting salient, which has a first sidewall, a second sidewall and an inclined surface tilted from the second sidewall to the first sidewall;
a second bearing shim having a sliding salient and an extension arm, wherein the extension arm is a long shaped structure, the sliding salient is disposed at a distal end of the extension arm, the main body is positioned at a first position relative to the supporting crutch when the sliding salient is disposed on the first sidewall, and the main body is positioned at a second position relative to the supporting crutch when the sliding salient is disposed on the second sidewall, wherein the sliding salient crosses the first sidewall and slides on the inclined surface to the second sidewall by a first force, and the sliding salient crosses the second sidewall and slides on the inclined surface to the first sidewall by a second force larger than the first; and
a third bearing shim having three cantilever arms for resting against the second bearing shim, wherein each of the cantilever arms extends outward from a center position of the third bearing shim, and the length of each of the cantilever arms correlates to magnitudes of the first force and the second force.

11. The pivot mechanism according to claim 10, wherein the first bearing shim further has an engaging slot and a sliding slot, the limiting salient is disposed between the engaging slot and the sliding slot, the sliding slot has the second sidewall and a third sidewall distant from the second sidewall by a distance, the sliding salient slides back and forth between the second sidewall and the third sidewall along the sliding slot by a third force, and the main body is positioned at a third position relative to the supporting crutch when the sliding salient is disposed on the third sidewall.

12. The pivot mechanism according to claim 11, wherein the electric device is a flat panel display, the main body has a display surface, and the supporting crutch is to be placed on a table.

13. The pivot mechanism according to claim 12, wherein:
the main body is substantially parallel to the supporting crutch to facilitate packaging when the main body is positioned at the first position; and
the main body is positioned in a visible region to facilitate a user in watching the display surface when the main body is located between the second position and the third position.

14. The pivot mechanism according to claim 12, wherein the electric device further comprises a connector for coupling the pivot mechanism to the main body, the connector has a first shaft hole, the second bearing shim has a second shaft hole, and the pivot mechanism further comprises:
a screw, wherein the cross-sectional profiles of the screw, the first shaft hole and the second shaft hole are substantially similar to one another, and the screw passes through the first shaft hole and the second shaft hole to fasten the main body, the connector and the second bearing shim together such that the main body, and the connector and the second bearing shim are rotated synchronously.

15. The pivot mechanism according to claim 14, further comprising:
a nut fit with the screw to clamp the connector and the second bearing shim.

16. The pivot mechanism according to claim 14, further comprising two first bearing shims and two second bearing shims, wherein the supporting crutch has two supporting crutch side plates opposite to each other in parallel and to be respectively coupled to the first bearing shims, and the connector further has two connector side plates opposite to each other in parallel and to be respectively coupled to the second bearing shims.

17. The pivot mechanism according to claim 10, further comprising:
an elastic member, which is disposed between the main body and the second bearing shim, for tightly pressing the second bearing shim and the first bearing shim together.

18. The pivot mechanism according to claim 10, wherein the first bearing shim has a plurality of positioning sink holes, and the supporting crutch has a plurality of positioning salients corresponding to the positioning sink holes such that the first bearing shim and the supporting crutch engage with each other and are synchronously rotated.

19. The pivot mechanism according to claim 10, wherein the extension arm is an L-shaped structure.

20. An electric device, comprising:
a main body;
a supporting crutch; and
a pivot mechanism for connecting the main body to the supporting crutch, wherein the main body is rotated around the supporting crutch through the pivot mechanism, and the pivot mechanism comprises:
a first bearing shim having three limiting salients, each of which has a first sidewall, a second sidewall and two inclined surface tilted from the second sidewall to the first sidewall and disposed at corresponding two sides of the first bearing shim; and
a second bearing shim having six sliding salients alternately protruded toward the corresponding two sides of the second bearing shim, wherein the main body is positioned at a first position relative to the supporting crutch when three of the sliding salients are disposed on the first sidewalls, and the main body is positioned at a second position relative to the supporting crutch when three of the sliding salients are disposed on the second sidewalls, wherein three of the sliding salients cross the first sidewalls and slide on the inclined surfaces to the second sidewalls by a first force, and three of the sliding salients cross the second sidewalls and slide on the inclined surfaces to the first sidewalls by a second force larger than the first force.

21. An electric device, comprising:
a main body;
a supporting crutch;
a pivot mechanism for connecting the main body to the supporting crutch, wherein the main body is rotated around the supporting crutch through the pivot mechanism, and the pivot mechanism comprises:
a first bearing shim having a limiting salient, which has a first sidewall, a second sidewall and an inclined surface tilted from the second sidewall to the first sidewall;
a second bearing shim having a sliding salient, wherein the main body is positioned at a first position relative to the supporting crutch when the sliding salient is disposed on the first sidewall, and the main body is positioned at a second position relative to the supporting crutch when the sliding salient is disposed on the second sidewall, wherein the sliding salient crosses the first sidewall and slides on the inclined surface to the second sidewall by a first force, and the sliding salient crosses the second sidewall and slides on the inclined surface to the first sidewall by a second force larger than the first force;

a third bearing shim having three cantilever arms for resting against the second bearing shim, wherein each of the cantilever arms extends outward from a center position of the third bearing shim, and the length of each of the cantilever arms correlates to magnitudes of the first force and the second force.

* * * * *